United States Patent
Tiana et al.

(10) Patent No.: US 10,220,960 B1
(45) Date of Patent: Mar. 5, 2019

(54) MODULATED LIGHTING INFRASTRUCTURE FOR IMPROVED LOW VISIBILITY DETECTION

(71) Applicant: Rockwell Collins, Inc., Cedar Rapids, IA (US)

(72) Inventors: Carlo L. Tiana, Portland, OR (US); Ming Yu, Beaverton, OR (US); Marvin R. Lovato, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 398 days.

(21) Appl. No.: 15/016,494

(22) Filed: Feb. 5, 2016

(51) Int. Cl.
  *H04N 7/18* (2006.01)
  *B64D 47/06* (2006.01)
  *H05B 33/08* (2006.01)
  *H04N 5/235* (2006.01)
  *H04N 5/04* (2006.01)
  *H04N 5/33* (2006.01)

(52) U.S. Cl.
  CPC .............. *B64D 47/06* (2013.01); *H04N 5/04* (2013.01); *H04N 5/2351* (2013.01); *H04N 5/2353* (2013.01); *H04N 5/332* (2013.01); *H04N 7/18* (2013.01); *H05B 33/0845* (2013.01)

(58) Field of Classification Search
  USPC .......................................................... 348/144
  See application file for complete search history.

(56) References Cited

U.S. PATENT DOCUMENTS

| 9,165,366 B2 | 10/2015 | Koukol et al. |
| 2013/0188049 A1* | 7/2013 | Koukol ................. G06T 7/0044 348/144 |

OTHER PUBLICATIONS

Bullough, Aviation Signal Lighting: Impacts of Lighting Characteristics on Visibility, 2011, 2(1), pp. 16-27 (Year: 2011).*

* cited by examiner

*Primary Examiner* — Sathyanaraya V Perungavoor
*Assistant Examiner* — Peet Dhillon
(74) *Attorney, Agent, or Firm* — Angel N. Gerdzhikov; Donna P. Suchy; Daniel M. Barbieri

(57) ABSTRACT

A modulated lighting infrastructure for a runway approach lighting system includes a network of LED emitters, emitting primarily in the visible spectral band, driven by control logic to emit brief high-frequency pulses of energy at peak brightness for a fraction of their duty cycle while emitting no energy for the remainder of the duty cycle. While the pulsed emissions of the approach lighting system are so brief as to appear normal to pilots (as the average intensity is unchanged), an onboard detection system can integrate a camera for short bursts at a high frame rate to detect images of the emitted high-frequency pulses against competing atmospheric and background illumination and display the detected images to the pilot. The emitter network may include additional emitters configured to emit energy in infrared and other spectral ranges for detection by onboard enhanced vision systems.

14 Claims, 8 Drawing Sheets

MODULATED LIGHTING INFRASTRUCTURE FOR IMPROVED LOW VISIBILITY DETECTION

BACKGROUND

Aircraft-based Enhanced Vision Systems (EVS) may experience difficulty detecting approach lighting systems (ALS), airport markings, and other important indicators of an airport environment. For example, EVS systems rely on the detection of radiation in spectral ranges outside the visible band. Conventional approaches to ALS incorporate incandescent lighting which emits significant portions of energy in the short-wave infrared (SWIR) band. EVS detection in the SWIR band is advantageous due to the relative advantage of atmospheric penetration of SWIR radiation (relative to both atmospheric penetration of visible-band radiation and background illumination due to solar radiation). Both visible-band and background atmospheric radiation compete with desirable ALS emissions for detection by onboard cameras or image sensors.

The background illumination competing with desirable signals for detection can be especially problematic in daylight conditions. For example, bright sunlight may illuminate a water-laden atmosphere (e.g., fog) resulting in a bright "airtight" background that easily saturates many modern image sensors, complicating or preventing the detection of less intense point sources (e.g., desirable ALS emissions) within this background illumination. Furthermore, modern ALS and other airfield lighting systems may incorporate light emitting diode (LED) based illumination in order to save energy and maintenance costs compared to conventional incandescent lighting systems. However, LED-based illumination systems often do not emit significant amounts of radiation outside the visible band, rendering ALS detection in alternative and advantageous spectral bands near impossible in daylight or "airtight" conditions.

A potential solution involves overwhelming background illumination by increasing the brightness of visible-band ALS emissions far beyond regulatory requirements (generally 5,000-30,000 cd) in order to drown out competing background illumination. However, the energy required for this approach may render it cost-prohibitive and result in brightness inappropriate for pilots.

SUMMARY

In one aspect, embodiments of the inventive concepts disclosed herein are directed to a modulated lighting infrastructure for low visibility detection of approach lighting. The infrastructure may include a network of emitters, each emitter of the network having a power input and generating, via light emitting diodes (LED), luminous output (e.g., radiation) having an average intensity of L over a cycle of d milliseconds (where L is at most 30,000 cd, or at an appropriate level prescribed for the particular function of that lighting system). The infrastructure may include control logic linked to the power input of each emitter of the network. The control logic may modulate the emitter network for each duty cycle by driving each emitter to generate pulsed radiation at a peak brightness far beyond regulatory requirements and at high frequencies (e.g., pulses at a peak intensity of $n*L$ for at most $d/n$ milliseconds), while maintaining average emitted power as prescribed by regulations.

In a further aspect, embodiments of the inventive concepts herein are directed to an aircraft-based detection and display system optimized to detect emissions of the modulated lighting infrastructure. The system may include a camera for capturing a frame sequence of individual frames, each frame associated with an integration period (e.g., the time required for the camera to capture the frame) and a ratio between the luminous intensity of the infrastructure emissions and the luminous intensity of atmospheric and background illumination. The system may include an image processor for receiving the captured frame sequence and detecting captured frames within the frame sequence wherein the intensity of the infrastructure emissions is greater than the intensity of the background illumination, and therefore detectable against the background illumination. The image processor may store the detected frames in sequence to an image buffer, discarding any remaining frames. The system may include a display unit for retrieving and displaying the sequence of detected frames.

In a still further aspect, embodiments of the inventive concepts disclosed herein are directed to a method for detection and display of an approach lighting system. The method may include capturing, via a camera or image sensor, a frame sequence including frames associated with a ratio of the luminous intensity of the approach lighting system to the luminous intensity of atmospheric or background illumination. The method may include detecting, via an image processor, one or more frames within the frame sequence wherein the intensity of the lighting system is greater than the intensity of the background illumination. The method may include sequentially storing the detected frames to an image buffer, discarding the remaining frames, and sequentially displaying the detected frames via a display unit.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
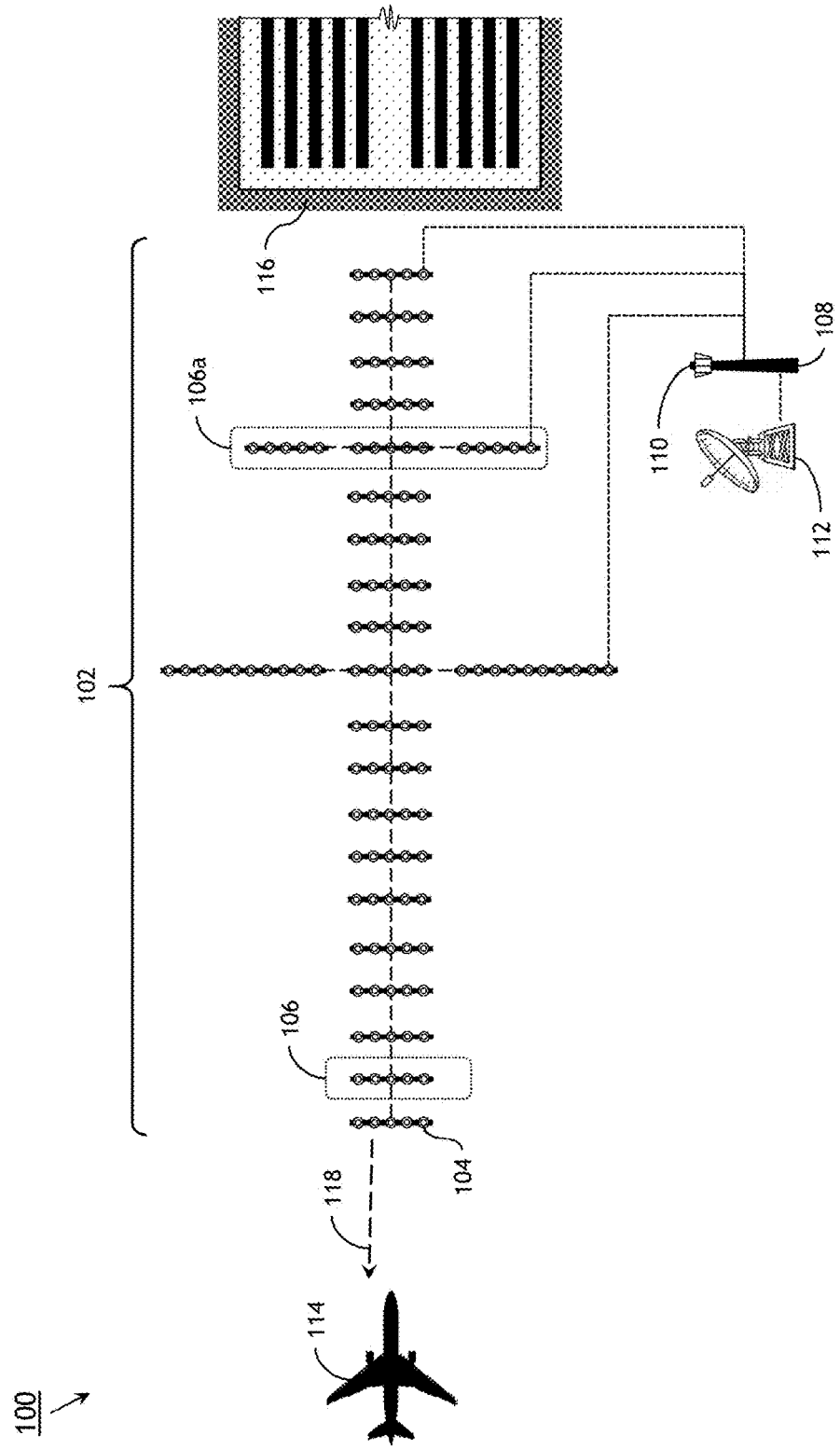
FIG. 1A illustrates an exemplary embodiment of a modulated lighting infrastructure system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a modulated lighting infrastructure optimized for detection by aircraft under adverse conditions where normal lighting emissions may be overwhelmed by background illumination, rendering it difficult for cameras and image sensors to accurately detect an approach lighting system. The modulated lighting infrastructure may include a network of emitters configured to emit energy at a significant multiple of its normal intensity for a fraction of its normal duty cycle. The average intensity over the full duty cycle is unchanged, so the system appears normal to the eye; however, optimized image sensors may distinguish the pulsed emission from background light and display the corresponding images of the lighting infrastructure, enhancing situational awareness.

Referring now to FIG. 1A, an exemplary embodiment of a modulated lighting infrastructure system 100 according to the inventive concepts disclosed herein includes an approach lighting system 102 comprising a network of emitters 104 which may be grouped into lighting assemblies 106, a control processor 108 for modulating the network of emitters 104 (which may be housed in a control tower 110 or similar ground-based facility), and a receiver 112. The control processor 108 may house control logic for energizing the network of emitters 104, or the control logic may be embodied in each emitter 104. The emitters 104 may be LED emitters configured to emit energy primarily in the visible spectral band for detection by a visible-band camera or image sensors aboard an aircraft 114. The approach lighting system 102 may guide the aircraft 114 toward a landing on a runway 116; the arrangement of individual lighting assemblies 106 and/or decision bars 106a may help the pilot to gauge the distance between the aircraft 114 and the runway 116, align the aircraft 114 with the runway 116 in anticipation of a landing, or assess visibility in the vicinity of the runway 116. In addition to the approach lighting system 102, the system 100 may be embodied in runway or airfield lighting systems of various configurations and installation sites, e.g., along the centerline or edges of the runway 116; at a threshold or touchdown zone of the runway 116; or along taxiways adjacent to the runway 116. The system 100 may include a dual-band or multi-band infrastructure, including visible-band emitters as well as LED sources configured to emit in other spectral bands, such as 850 nm near-infrared (NIR) emitters; eye-safe emitters configured for short-wave infrared (SWIR) frequencies (e.g., 1500 nm); or medium-wave IR (MWIR) and long-wave IR (LWIR) emitters detectable by an enhanced vision system (EVS). Emitters 104 of a given non-visible frequency or spectral range may be configured to operate in parallel with, or may be collocated with, a visible-band LED emitter system or conventional incandescent lighting system. The control logic may drive the emitters 104 to emit brief high-frequency pulses 118 at a peak brightness far above the average luminous intensity of the normal emissions of the emitters 104. Furthermore, the high-frequency pulses 118 may be so brief as to be indistinguishable by the pilot's eye, yet detectable by a properly configured image sensor (128, FIG. 1B) having an integration period (148, FIG. 3A) longer than the duration (142a, FIG. 3A) of the high-frequency pulse 118. For example, a network of emitters 104 may have an average luminous intensity (e.g., brightness) L over a duty cycle of time d; L may be anywhere in the range of 50 cd (for, e.g., taxiway lighting) to 30,000 cd (for an approach lighting system 102). The control processor 108 may pulse the emitters 104 for a fraction of the duty cycle d of the emitters (142, FIG. 3A), e.g., for d/N ms, at a peak brightness N*L, or N times the average intensity L (where N is a positive integer). The peak brightness of the high-frequency pulses 118 need not be proportional to the duration 142a of the high-frequency pulses; for example, the emitters 104 may be driven to pulse for d/N ms at a peak brightness M*L (where M, N are positive integers and M≠N). The emitters 104 may be driven to emit no radiation for the remainder of the duty cycle d; the duration 142a of the high-frequency pulses 118 is too brief for detection by the pilot's eye and the average luminous intensity over the duty cycle d remains at L. However, a properly configured image sensor may detect the high-frequency pulse 118 compared to competing background illumination (120, FIG. 3A).

Figure 1B:
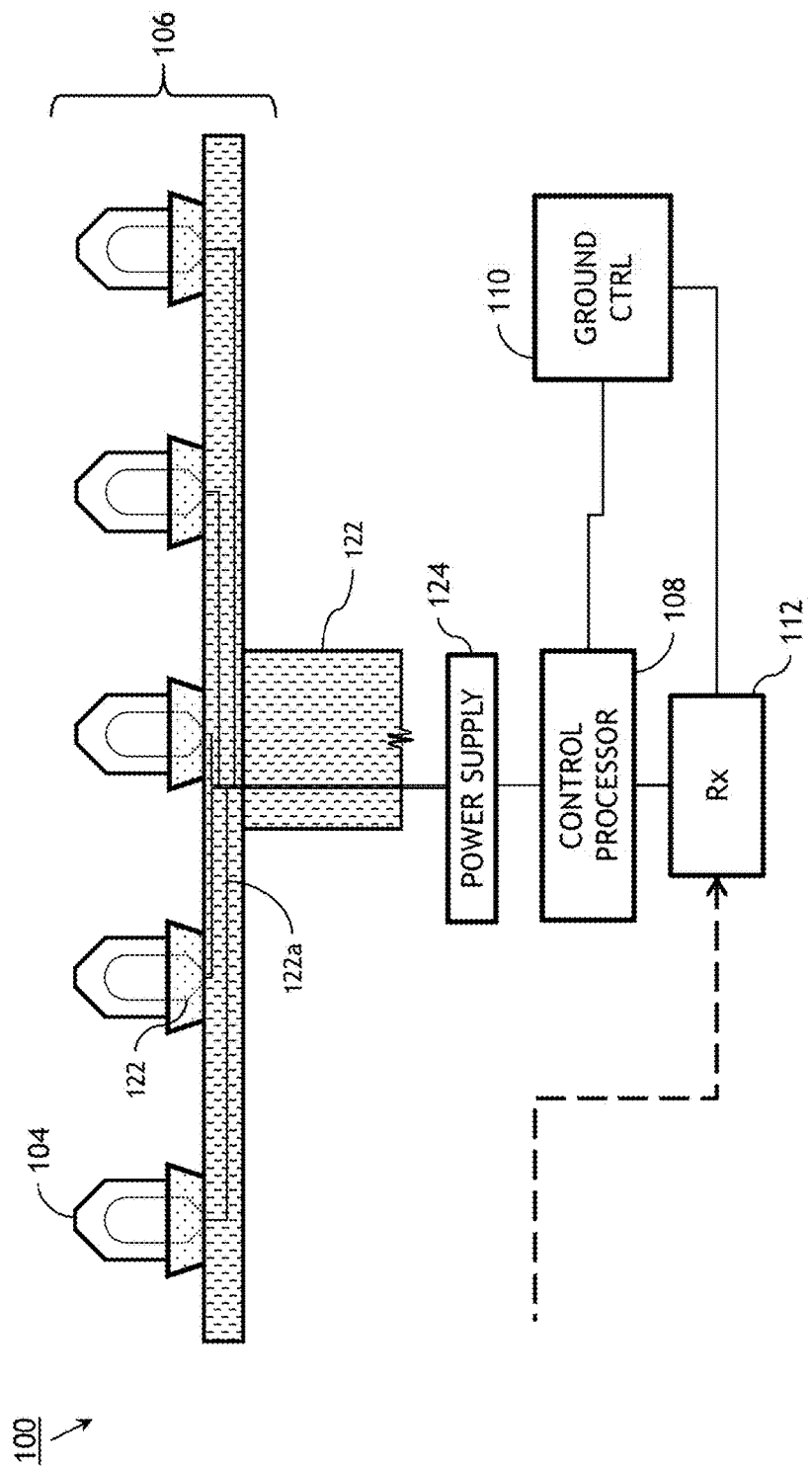
FIG. 1B illustrates an exemplary embodiment of a lighting assembly of the system of FIG. 1A according to the inventive concepts disclosed herein.

Referring to FIG. 1B, an exemplary embodiment of the approach lighting system 102 of FIG. 1A (incorporating the modulated lighting infrastructure system 100 of FIG. 1A) may incorporate a configuration of lighting assemblies 106. Each lighting assembly 106 may include a group of emitters 104 mounted to a superstructure 122. Each emitter 104 may include a power input 122a connecting the emitters 104 to a central power supply 124. The control processor 108 (or control logic) may drive each emitter 104 via the central power supply 124, pulsing the network of emitters 104 on command to save energy. For example, the control processor 108 may control the distribution of power from the central power supply 124 to each individual emitter 104. The control processor 108 may be manually activated to pulse the emitters 104 of each lighting assembly 106 by the crew of an airport control tower or similar ground control facility 110, upon request by the pilot or crew of the approaching aircraft 114. If the system 100 is implemented at a smaller, non-towered airfield, the system 100 may be a pilot-controlled system including a receiver 112 configured to receive a key-in message or similar signal from a pilot or crewmember of the aircraft 114, e.g., by keying a transmit switch at a particular aircraft radio control of aerodrome lighting (ARCAL) frequency in a particular sequence to activate or deactivate the system 100. Where the lighting assembly 106 or approach lighting system 102 includes multiple sets of emitters 104, e.g., a set of emitters 104 configured for a visible spectral band and an alternate set of emitters 104 in parallel to the first set and configured for an infrared or other non-visible spectral band, the control processor 108 may separately energize only the set of visible-band emitters 104, only the alternate set of nonvisible-band emitters 104, or both sets simultaneously as needed.

Figure 2:
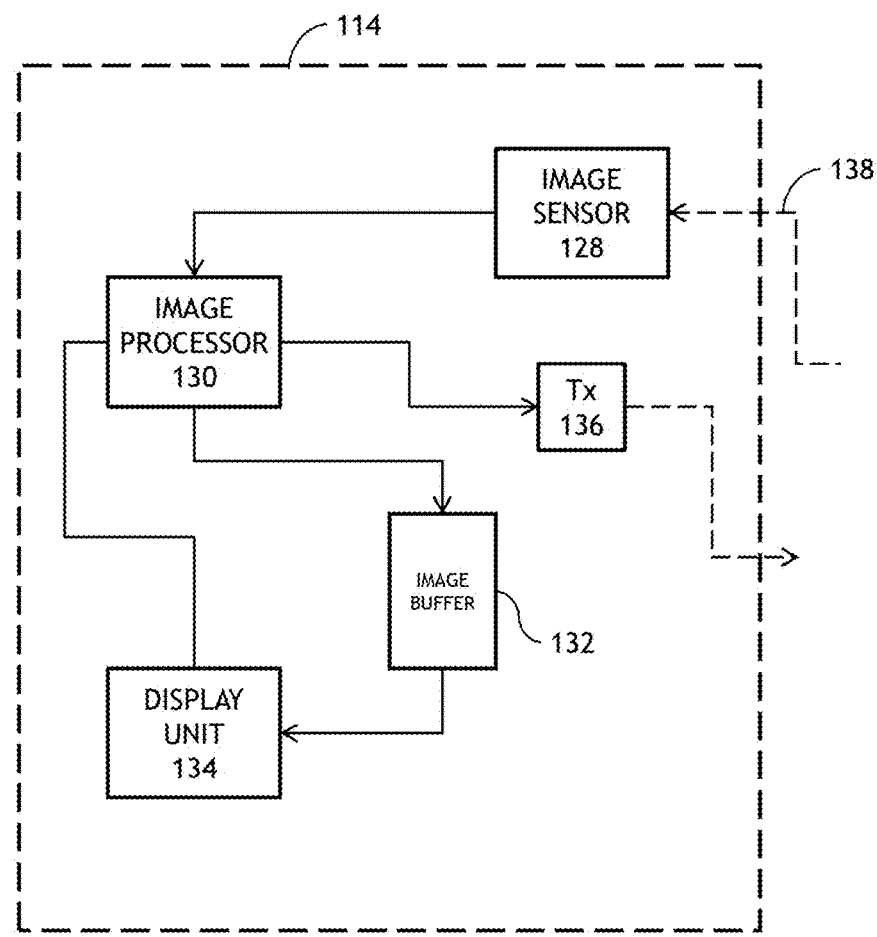
FIG. 2 illustrates an exemplary embodiment of an aircraft-based detection and display system according to the inventive concepts disclosed herein.

Referring now to FIG. 2, a detection and display system 126 optimized to detect the approach lighting system 102 of FIGS. 1A-B may include a camera (e.g., image sensor) 128, an image processor 130, an image buffer 132, and a display unit 134. The detection and display system 126 may include a transmitter 136. The detection and display system 126 may be incorporated into an EVS of the aircraft 114. The image sensor 128 may capture a stream of images of the runway 116 (FIG. 1A) including the approach lighting system 102 by free-running, or integrating for short intervals at high frame rates to capture a series of short subframes 138 for each duty cycle (the duty cycle of the image sensor 128 corresponding to the time required for to capture a standard image or frame). The image sensor 128 may be tuned to detect emissions in a visible spectral range or in an infrared or other nonvisible spectral range (e.g., NIR, SWIR). The image sensor 128 may be a multispectral image sensor. For example, the image sensor 128 may have a standard frame rate of 30 Hz (equivalent to a display cycle of 1/30 s≈33.3 ms, or about 33 frames per second (fps)). The image sensor 128 may free-run by integrating at 300 Hz, capturing a stream of 10 subframes 138 for each≈33 ms display cycle, which subframes may be processed by the image processor 130 for detection and display. If the frequency of the high-frequency pulses 118 generated by the emitters 104 is higher than the integration frequency of the image sensor (e.g., 1000 Hz pulses and 300 Hz subframe integration) the probability is increased that one or more captured subframes 138 will correspond to a full high-frequency pulse.

The captured subframes 138 may be analyzed by the image processor 130 to identify images corresponding to high-frequency pulses, or images in which the intensity of the energy emitted by the emitters 104 (FIGS. 1A-B) is significantly greater than the intensity of atmospheric and background illumination, e.g., images in which the approach lighting system 102 can be detected with a high degree of confidence. Any such subframes 138 identified by the image processor 130 may be stacked into an image superset stored in an image buffer 132 for retrieval by the display unit 134. The image processor 130 may discard any captured frames not corresponding to high-frequency pulses 118. The transceiver 136 may be configured to automatically signal the approach lighting system 102 (via the receiver 112 (FIG. 1A-B)) to energize the emitters 104 of the approach lighting system 102 when prompted by the image processor 130. The transceiver 136 may signal the approach lighting system 102 via the receiver 112 by transmitting a signal generated by a pilot or crewmember aboard the aircraft 114, e.g., an ARCAL frequency or similar pilot control signal.

Figure 3A:
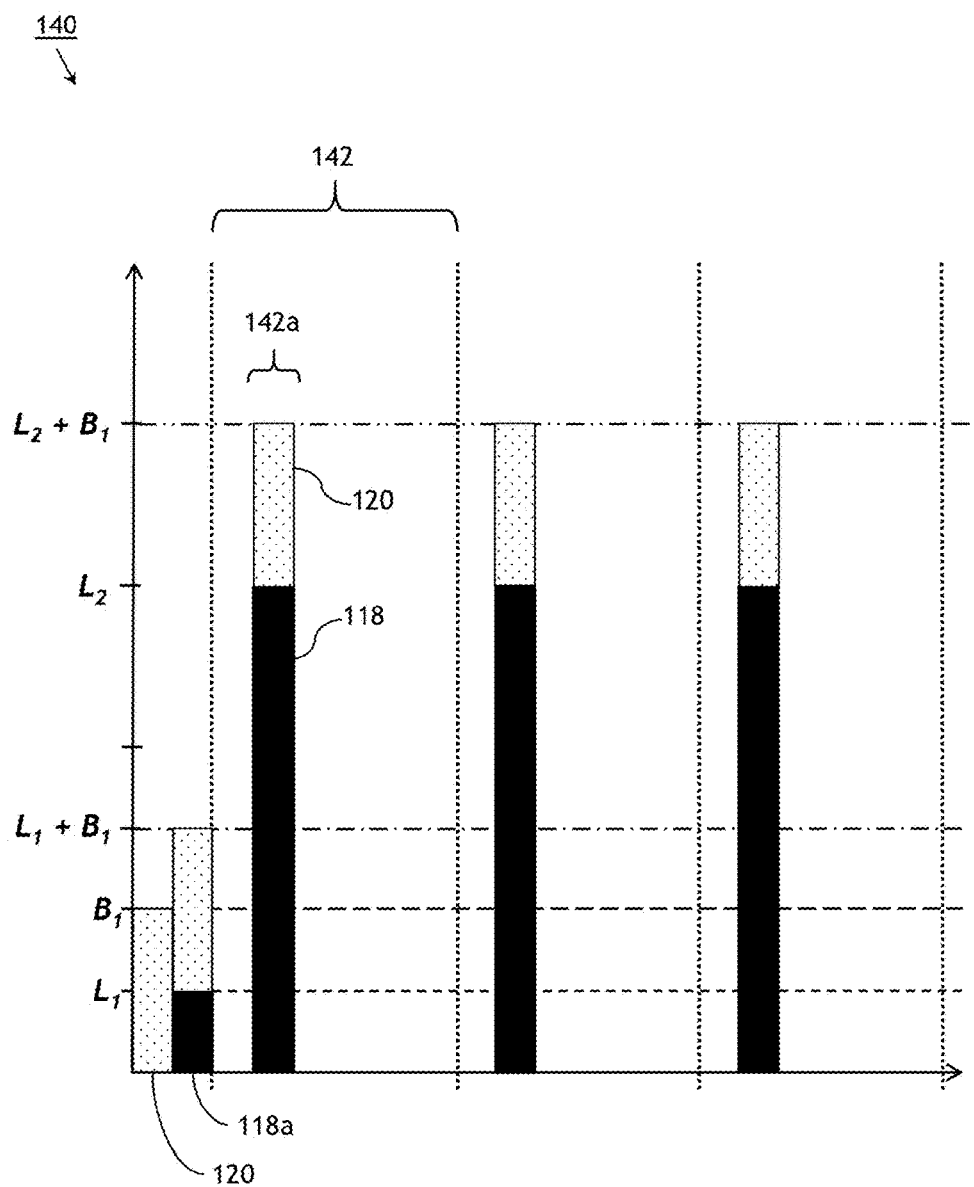
FIGS. 3A-3D illustrate the interaction of exemplary embodiments of the modulated lighting infrastructure system of FIGS. 1A-B and the detection and display system of FIG. 2 according to the inventive concepts disclosed herein.

Referring to FIG. 3A, graph 140 illustrates the improved detectability of the modulated lighting infrastructure system 100 of FIG. 1A according to the inventive concepts disclosed herein. For example, the emitters 104 (FIG. 1A-B) of the system 100 may generate radiation having an average luminous intensity $L_1$ over a normal duty cycle 142 (of time d; e.g., 5 ms). Under normal daylight conditions, the normal emissions 118a of the emitters 104 may be overwhelmed by the greater luminous intensity $B_1$ of background illumination 120. The emitters 104 may be driven to emit a high-frequency pulse 118 having a duration (142a) only a fraction (d/N; e.g., 0.5 ms) of the normal duty cycle 142 but having a far higher peak brightness $L_2$ (e.g., 10 times the average brightness $L_1$) that overwhelms the luminous intensity $B_1$ of background illumination 120, providing for easier detection by a properly configured image sensor (128, FIG. 2).

Figure 3B:
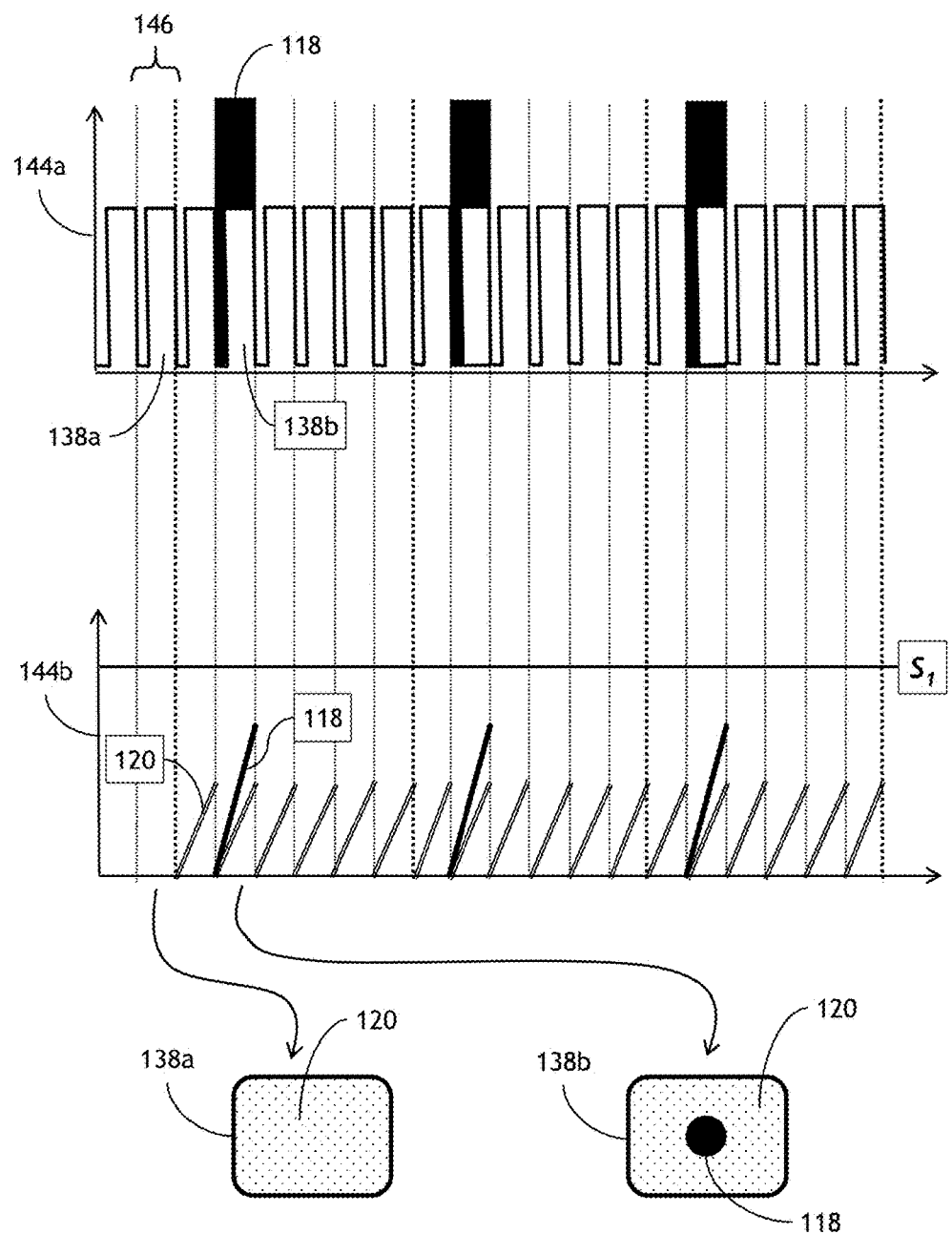

Referring to FIG. 3B, graphs 144a-b illustrate the detection of the modulated lighting infrastructure system 100 of FIG. 1A by a synchronous image sensor 128 of an exemplary embodiment of the detection and display system 126 of FIG. 2 according to the inventive concepts disclosed herein. Referring to graph 144a, the image sensor 128 may be synchronized to the network of emitters 104 (FIG. 1A-B) of the system 100. For example, the image sensor 128 may be synchronized to capture subframes (138, FIG. 2) at high speed and at regular intervals (e.g., integration periods 146) corresponding to the frequency of the high-frequency pulses 118 generated by the emitters 118. Referring also to graph 144b, the luminous intensity of background illumination 120 may remain consistent through each subframe 138, resulting in many subframes (138a) wherein the emitters 104 emit no radiation and therefore the system 100 may not be detectable over background illumination 120, and which the image processor 130 (FIG. 1B) may discard. However, the integration period 146 of some subframes (138b) may coincide with a high-frequency pulse 118; therefore the high-frequency pulse 118 may be detectable against background illumination 120 within the subframe 138b. Furthermore, due to the short duration of the integration period 146, the luminous intensity $B_1$ may never reach the point of saturation $S_1$ (i.e., where background illumination 120 saturates the image sensor 128). The image processor 130 may sequentially save subframes 138b in which the high-frequency pulses 118 are detectable to the image buffer 134 for display.

Figure 3C:
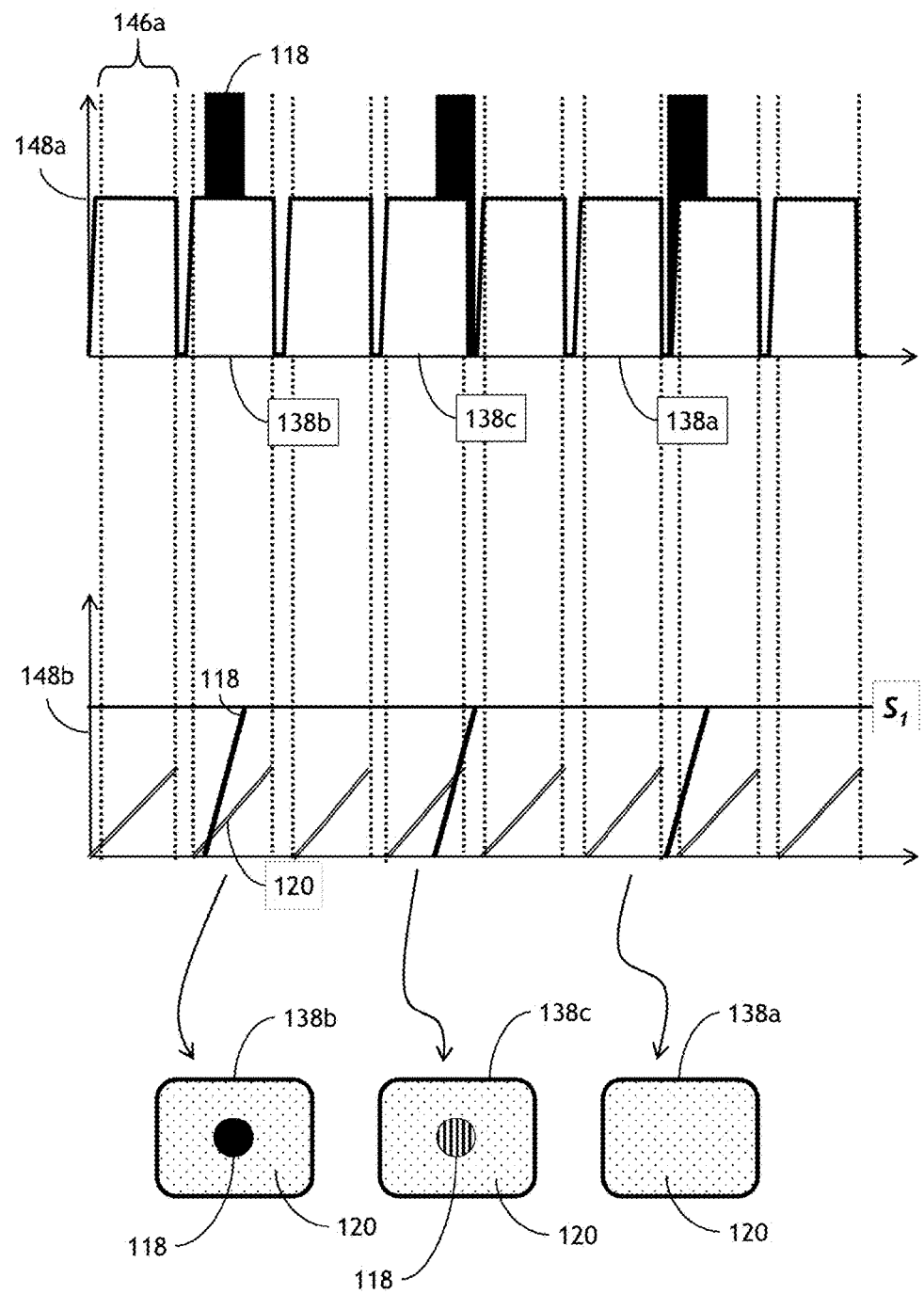

Referring to FIG. 3C, an exemplary embodiment of the detection and display system 126 of FIG. 2 may operate similarly to the system described by FIG. 3B, except that the image sensor 128 (FIG. 2) may free-run asynchronously with respect to the emitters 104 (FIGS. 1A-B) of the system

100. For example, referring to graphs 148*a-b*, the high-frequency pulses 118 generated by the emitters 104 may be 1000 Hz pulses approximately 1 ms in duration, similarly to FIG. 3B. The integration period 146*a* of the image sensor 128 may not be precisely synchronized with the high-frequency pulses 118, but an integration period 146*a* of greater duration than the high-frequency pulses 118 (e.g., ≈2-2.5 ms) may fully or partially capture a high-frequency pulse 118 within a subframe 138*b-c*. The image processor 130 may sequentially save for further display subframes 138*b-c*, in which the high-frequency pulses 118 may respectively be fully or partially detectable, while discarding subframes 138*a* in which no high-frequency pulses 118 are detectable.

Figure 3D:
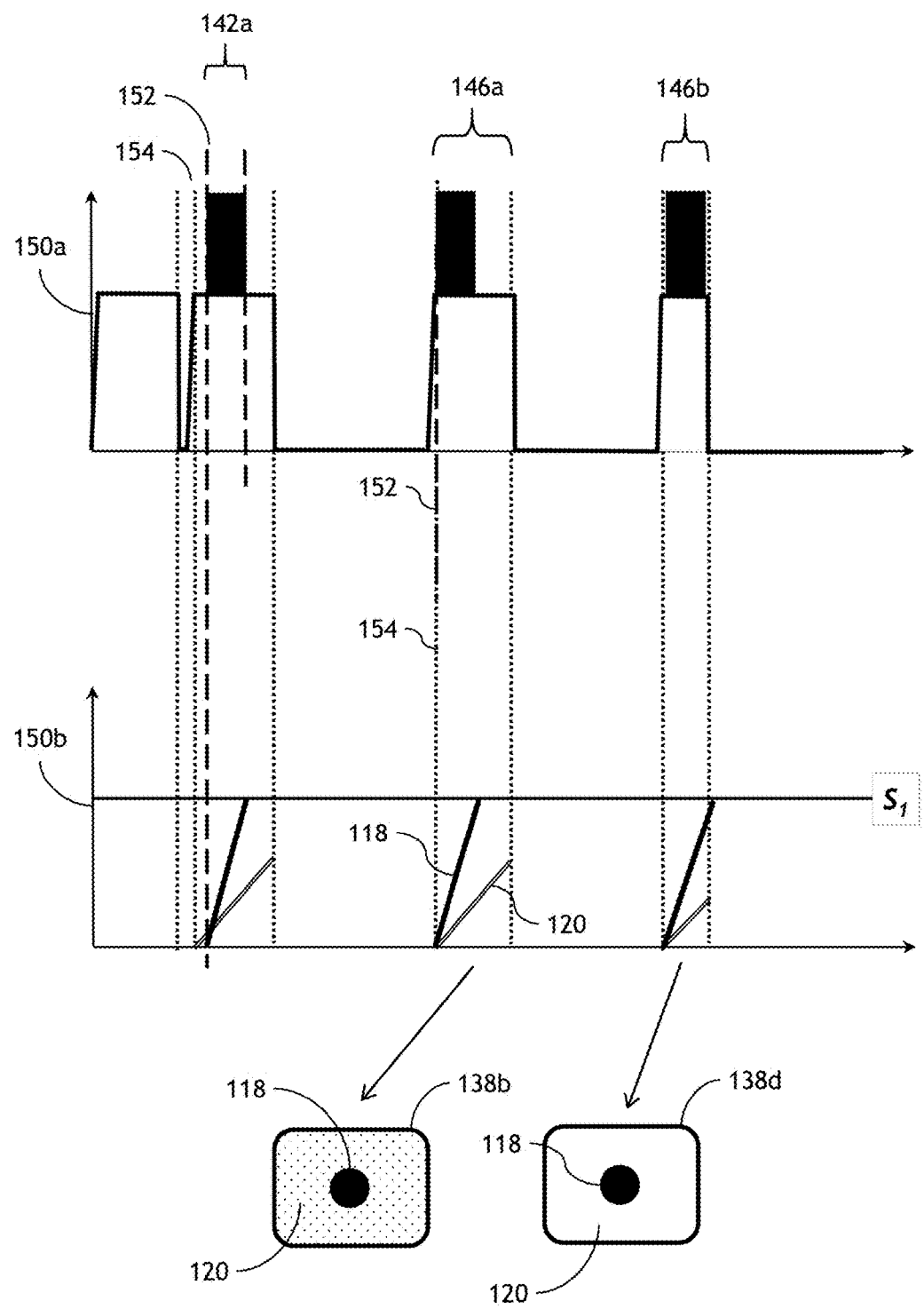

Referring to FIG. 3D, an exemplary embodiment of the detection and display system 126 of FIG. 2 may operate similarly to the system described by FIG. 3C, except that the image sensor 128 (FIG. 2) may be self-synchronizing. For example, referring to graphs 150*a-b* the integration periods 146*a* of the image sensor 128 may not synchronize precisely with the duration (142*a*) of the high-frequency pulses 118 generated by the emitters 104. However, the image sensor 128 may detect the start time 152 of the high-frequency pulses 118 and adjust the start time 154 of the integration period 146*a* to match the start time 152 of the high-frequency pulses 118 so that each subsequent integration period 146*a* coincides with a high-frequency pulse 118, resulting in a sequence of subframes 138*b* wherein the high-frequency pulse 118 is more easily detectable against background illumination 120. The image sensor 128 may adjust the integration period (146*b*) to match the duration (142*a*) of the high-frequency pulses 118, resulting in subframes (138*d*) in which the high-frequency pulses are optimally detectable against background illumination 120.

Figure 4:
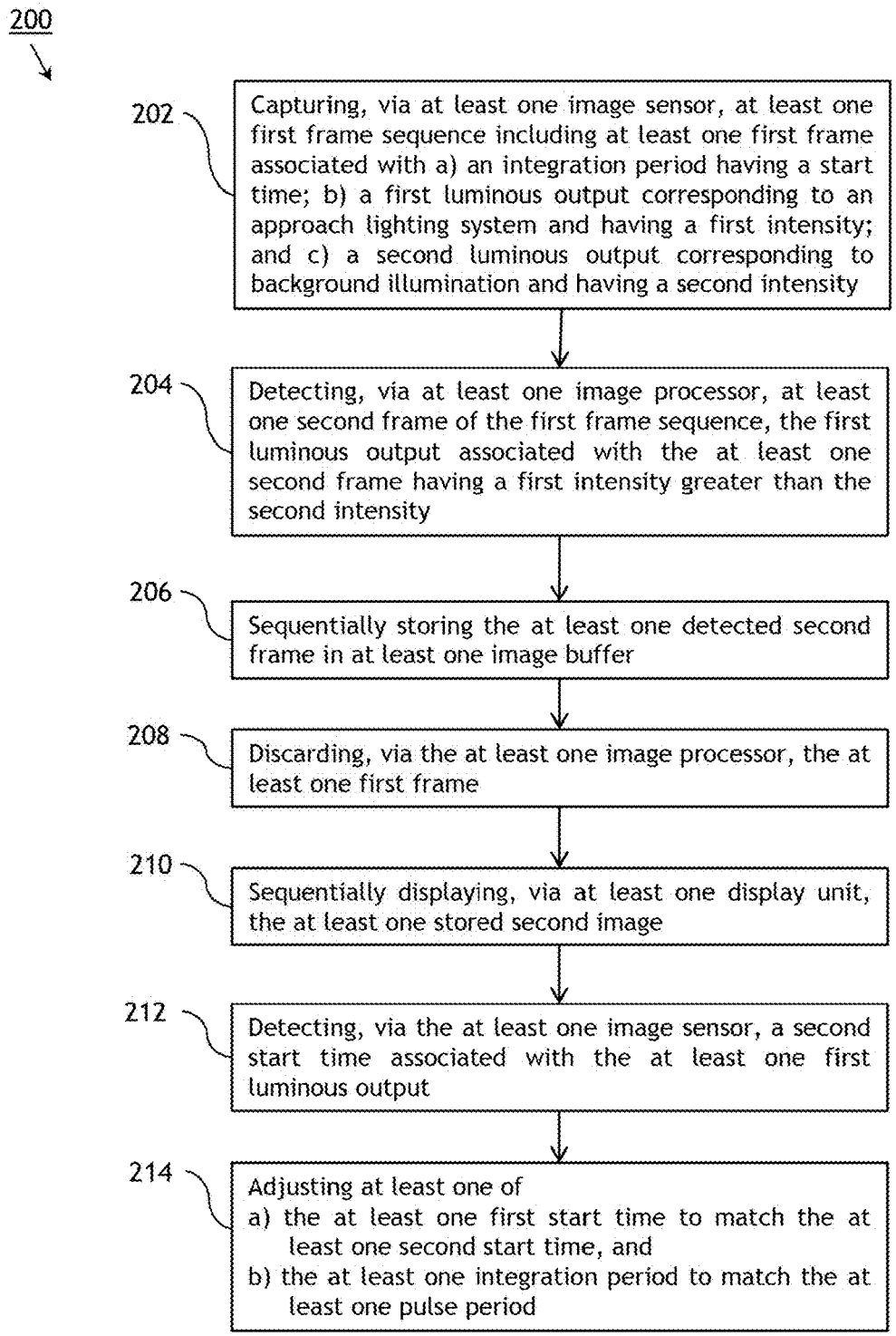
FIG. 4 is a process flow diagram illustrating a method according to embodiments of the inventive concepts disclosed herein.

Referring now to FIG. 4, an exemplary embodiment of a method 200 for detecting a modulated lighting infrastructure system 100 according to the inventive concepts disclosed herein may include one or more of the following steps. At a step 202, an image sensor 128 of the detection and display system 126 captures a sequence of subframes 138 corresponding to a duty cycle of the image sensor 128, the sequence of subframes 138 including at least one subframe 138*b* associated with 1) a high-frequency pulse 118 of the approach lighting system 102 and having an intensity $L_2$ and 2) background illumination 120 having an intensity $B_1$. For example, the image sensor 128 may capture a sequence of subframes 138 corresponding to the inverse of a frame rate of the image sensor 128, each subframe 138 associated with an integration period 146, 146*a* of the image sensor 128 that may or may not synchronize with the high-frequency pulse 118 generated by the emitters 104 of the system 100. The image sensor 128 may be a visible-band image sensor; an infrared image sensor tuned to emissions in the NIR, SWIR, or LWIR spectral bands; or a multispectral image sensor.

At a step 204, an image processor 130 of the detection and display system 126 detects a subframe 138*b* within the sequence of subframes 138 wherein the intensity $L_2$ of the high-frequency pulse 118 is greater than the intensity $B_1$ of the background illumination 120.

At a step 206, the image processor 130 sequentially stores the at least one detected subframe 138*b* in an image buffer 132 of the detection and display system 126.

At a step 208, the image processor 130 discards the one or more subframes 138*a* not associated with a detectable high-frequency pulse 118.

At a step 210, a display unit 134 of the detection and display system 126 sequentially displays the at least one stored subframe 138*b*.

The method 200 may include additional steps 212 and 214. At the step 212, the image sensor 128 detects the start time 152 of the high-frequency pulse 118.

At the step 214, the image sensor 128 adjusts one or more of a) the start time 154 of the integration period 146*a* of the image sensor 128 to match the detected start time 152 of the high-frequency pulses 118 and b) the duration of the integration period 146*b* to match the duration 142*a* of the high-frequency pulses 118.

As will be appreciated from the above, systems and methods according to embodiments of the inventive concepts disclosed herein may enhance situational awareness by optimizing the visibility of runway lighting systems to approaching aircraft, especially under adverse conditions (e.g., humid atmosphere, bright sunlight) where visible-band LED emissions may be overwhelmed by background illumination, rendering it difficult for cameras and image sensors to accurately detect or locate the approach lighting system. The modulated lighting infrastructure system allows airport facilities to use lower-energy (and thus lower-cost) LED-based approach lighting systems. At the same time, efficient use can be made of the energy deployed to LED-based lighting systems by maximizing visibility by onboard enhanced vision systems while preserving compliance with brightness specifications for pilot visibility.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An aircraft-based lighting detection and display system, comprising:
    at least one image sensor configured to capture at least one first frame sequence including at least one first frame associated with:
        a) an integration period having a start time;
        b) a first luminous output corresponding to an approach lighting system and having a first intensity; and
        c) a second luminous output corresponding to background illumination and having a second intensity;
    at least one image processor coupled to the at least one image sensor and configured to:
        receive the at least one first frame sequence from the at least one image sensor;
        detect at least one second frame within the at least one first frame sequence, the first luminous output of the at least one second frame having a first intensity greater than the second intensity of the second luminous output; and generate at least one second frame sequence by sequentially storing the at least one second frame in at least one image buffer;

and at least one display unit coupled to the at least one image processor and to the at least one image buffer, the at least one display unit configured to sequentially display the at least one second frame sequence.

2. The system of claim 1, wherein:

the at least one image sensor is associated with:

a frame rate of F hertz;

a display cycle of 1/F seconds corresponding to the first frame sequence, the first frame sequence including P frames, where P is a positive integer; and an integration period of $1/(P*F)$ seconds;

and the at least one start time is a first start time, and the approach lighting system is associated with at least one pulse period corresponding to a pulsed emission, the at least one pulse period having a second start time and at most equal to the at least one integration period.

3. The system of claim 2, wherein the at least one first start time is synchronized to the at least one second start time.

4. The system of claim 2, wherein the at least one image sensor is further configured to:

detect the at least one second start time;

and adjust the at least one first start time to match the at least one second start time.

5. The system of claim 2, wherein the at least one image sensor is further configured to adjust the at least one integration period to match the at least one pulse period.

6. The system of claim 1, wherein the at least one image sensor includes at least one of:

a first image sensor associated with a visible spectral band; and a second image sensor associated with at least one non-visible spectral band, the at least one approach lighting system configured for emission in the at least one non-visible spectral band;

and a multispectral image sensor.

7. The system of claim 1, wherein the system is embodied in an aircraft-based enhanced vision system.

8. An aircraft-based method for lighting detection and display, comprising:

capturing, via at least one image sensor, at least one first frame sequence including at least one first frame associated with a) an integration period having a start time; b) a first luminous output corresponding to an approach lighting system and having a first intensity; and c) a second luminous output corresponding to background illumination and having a second intensity;

detecting, via at least one image processor, at least one second frame of the first frame sequence, the first luminous output associated with the at least one second frame having a first intensity greater than the second intensity;

sequentially storing the at least one detected second frame in at least one image buffer;

discarding, via the at least one image processor, the at least one first frame;

and sequentially displaying, via at least one display unit, the at least one stored second frame.

9. The method of claim 8, wherein capturing, via at least one image sensor, at least one first frame sequence including at least one first frame associated with a) an integration period having a start time; b) a first luminous output corresponding to an approach lighting system and having a first intensity; and c) a second luminous output corresponding to background illumination and having a second intensity includes capturing, via at least one image sensor having a frame rate of F hertz, at least one frame sequence including at least P first frames and corresponding to a display cycle of 1/F seconds, where P is a positive integer, each first frame associated with a) an integration period of at most $1/(P*F)$ seconds; b) a first luminous output corresponding to an approach lighting system and having a first intensity and c) a second luminous output corresponding to background illumination and having a second intensity.

10. The method of claim 8, wherein capturing, via at least one image sensor, at least one first frame sequence including at least one first frame associated with a) an integration period having a start time; b) a first luminous output corresponding to an approach lighting system and having a first intensity; and c) a second luminous output corresponding to background illumination and having a second intensity includes:

capturing, via at least one image sensor, at least one first frame sequence including at least one first frame associated with a) an integration period having a first start time; b) a first luminous output corresponding to an approach lighting system and associated with a second start time; and c) a second luminous output corresponding to background illumination and having a second intensity; the at least one first start time synchronized to the at least one second start time.

11. The method of claim 8, wherein the at least one start time is a first start time, further comprising:

detecting, via the at least one image sensor, at least one of a second start time and a pulse period associated with the at least one first luminous output; and adjusting at least one of a) the at least one first start time to match the at least one second start time, and b) the at least one integration period to match the at least one pulse period.

12. The method of claim 8, wherein capturing, via at least one image sensor, at least one first frame sequence including at least one first frame associated with a) an integration period having a start time; b) a first luminous output corresponding to an approach lighting system and having a first intensity; and c) a second luminous output corresponding to background illumination and having a second intensity includes:

capturing, via at least one image sensor associated with a visible spectral band, at least one first frame sequence including at least one first frame associated with a) an integration period having a start time; b) a first luminous output corresponding to an approach lighting system and having a first intensity; and c) a second luminous output corresponding to background illumination and having a second intensity.

13. The method of claim 8, wherein capturing, via at least one image sensor, at least one first frame sequence including at least one first frame associated with a) an integration period having a start time; b) a first luminous output corresponding to an approach lighting system and having a first intensity; and c) a second luminous output corresponding to background illumination and having a second intensity includes:

capturing, via at least one image sensor associated with an infrared spectral band, at least one first frame sequence including at least one first frame associated with a) an integration period having a start time; b) a first luminous output corresponding to an approach lighting system and having a first intensity; and c) a second luminous output corresponding to background illumination and having a second intensity.

14. The method of claim 13, wherein capturing, via at least one image sensor associated with an infrared spectral band, at least one first frame sequence including at least one first frame associated with a) an integration period having a start time; b) a first luminous output corresponding to an approach lighting system and having a first intensity; and c) a second luminous output corresponding to background illumination and having a second intensity, includes:

capturing, via at least one image sensor associated with one or more of a short-wave infrared (SWIR) spectral band and a near-infrared (NIR) spectral band, at least one first image sequence including at least one first image associated with a) an integration period having a start time; b) a first luminous output corresponding to an approach lighting system and having a first intensity; and c) a second luminous output corresponding to background illumination and having a second intensity.

\* \* \* \* \*